(12) United States Patent
Kamiya

(10) Patent No.: US 12,189,849 B2
(45) Date of Patent: Jan. 7, 2025

(54) PROCESSOR, INFORMATION PROCESSING METHOD, AND INFORMATION PROCESSING PROGRAM

(71) Applicant: FUJIFILM Corporation, Tokyo (JP)

(72) Inventor: Takeshi Kamiya, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 18/469,943

(22) Filed: Sep. 19, 2023

(65) Prior Publication Data
US 2024/0111362 A1   Apr. 4, 2024

(30) Foreign Application Priority Data

Sep. 30, 2022 (JP) ................................. 2022-159106

(51) Int. Cl.
| | | |
|---|---|---|
| G06F 3/01 | (2006.01) | |
| G06T 7/73 | (2017.01) | |
| G09G 3/00 | (2006.01) | |

(52) U.S. Cl.
CPC ............. G06F 3/013 (2013.01); G06T 7/73 (2017.01); G09G 3/002 (2013.01); *G06T 2207/30204* (2013.01); *G09G 2340/0464* (2013.01); *G09G 2354/00* (2013.01)

(58) Field of Classification Search
CPC . G06F 3/013; G06F 3/011; G06T 7/73; G06T 2207/30204; G09G 3/002; G09G 2340/0464; G09G 2354/00
See application file for complete search history.

(56) References Cited

U.S. PATENT DOCUMENTS

| | | | | |
|---|---|---|---|---|
| 10,089,786 | B2 * | 10/2018 | Liu ......................... | G06F 3/011 |
| 2014/0139453 | A1 * | 5/2014 | Yu ......................... | G02B 27/017 |
| | | | | 345/173 |
| 2014/0191929 | A1 * | 7/2014 | Kim ....................... | G06F 3/013 |
| | | | | 345/8 |
| 2014/0375683 | A1 * | 12/2014 | Salter ..................... | G06F 3/011 |
| | | | | 345/633 |

(Continued)

FOREIGN PATENT DOCUMENTS

JP   2018-147144 A   9/2018

OTHER PUBLICATIONS

Extended European Search Report for corresponding European Application No. 23200226.1, dated Jan. 24, 2024.

*Primary Examiner* — Bryan Earles
(74) *Attorney, Agent, or Firm* — Birch, Stewart, Kolasch & Birch, LLP

(57) ABSTRACT

A processor is configured to compare a captured image captured by a camera of a transmissive display device, information representing a position of marking performed on the captured image displayed on another display device, a region of a real space in which a display image is displayable by the transmissive display device, and the position of the marking in the real space, display information representing the position of the marking in the real space, acquire a detection result obtained by detecting a visual line of a user of the transmissive display device, compare the detection result of the visual line with the position in the real space of the marking or information representing the position in the real space of the marking, and change the marking or a display state of the information representing the position of the marking.

4 Claims, 5 Drawing Sheets

(56) References Cited

U.S. PATENT DOCUMENTS

| | | | |
|---|---|---|---|
| 2015/0170419 A1* | 6/2015 | Ohashi | G06F 3/011 |
| | | | 345/419 |
| 2019/0172266 A1* | 6/2019 | Short | G06V 20/20 |
| 2019/0212828 A1* | 7/2019 | Kin | G06F 3/04815 |
| 2020/0004328 A1* | 1/2020 | Blume | G06F 3/017 |

* cited by examiner

PROCESSOR, INFORMATION PROCESSING METHOD, AND INFORMATION PROCESSING PROGRAM

CROSS REFERENCE TO RELATED APPLICATIONS

This application claims priority from Japanese Application No. 2022-159106, filed on Sep. 30, 2022, the entire disclosure of which is incorporated herein by reference.

BACKGROUND

1. Technical Field

The present disclosure relates to a processor, an information processing method, and a non-transitory storage medium storing an information processing program.

2. Related Art

A transmissive display device such as an augmented reality (AR) device that displays a state in which images are superimposed in a real space is known in the related art. A technology of outputting information to a user of the transmissive display device based on an image captured by a camera attached to the transmissive display device is known.

For example, in JP2018-147144A, a technology of receiving image information captured by a camera attached to a head-mounted display and outputting work support information to a site-side information presenting device based on the image information.

SUMMARY

However, in the related art, it may not be sufficient to allow the user of the transmissive display device to visually recognize the output information.

The present disclosure has been made in view of the above circumstances, and an object of the present disclosure is to provide a processor, an information processing method, and a non-transitory storage medium storing an information processing program capable of sufficiently allowing a user of a transmissive display device to visually recognize a position in a real space corresponding to marking.

In order to achieve the above object, a processor of a first aspect of the present disclosure is configured to: compare a captured image captured by a camera attached to a transmissive display device, information representing a position of marking performed on the captured image displayed on a display device different from the transmissive display device, a region of a real space in which a display image is displayable by the transmissive display device, and the position of the marking in the real space; display information representing the position of the marking in the real space in a case in which a position in the real space of the marking in the real space is outside the region of the real space in which the display image is displayable; acquire a detection result obtained by detecting a visual line of a user of the transmissive display device; compare the detection result of the visual line with the position in the real space of the marking or information representing the position in the real space of the marking; and change a display state of the marking or a display state of information representing the position of the marking.

According to a processor of a second aspect of the present disclosure, in the processor of the first aspect, the detection result of the visual line is information on a direction of the visual line of the user.

According to a processor of a third aspect of the present disclosure, in the processor of the second aspect, the change of the display state is to change the display state according to whether the position in the real space of the marking is outside or within the region of the real space in which the display image is displayable.

According to a processor of a fourth aspect of the present disclosure, in the processor of the second aspect, the change of the display state is based on a time during which the information on the direction of the visual line is directed to the position of the marking or a position of the information representing the position of the marking.

According to a processor of a fifth aspect of the present disclosure, in the processor of the fourth aspect, the change of the display state changes the change of the display state of the information according to an attribute given to the marking.

According to a processor of a sixth aspect of the present disclosure, in the processor of the second aspect, the processor is configured to change a display form of the information representing the position of the marking according to a distance from the position in the real space of the marking, in a case in which the position in the real space of the marking is outside the region of the real space in which the display image is displayable in the transmissive display device.

In order to achieve the above object, an information processing method of a seventh aspect of the present disclosure executed by a processor, comprises: comparing a captured image captured by a camera attached to a transmissive display device, information representing a position of marking performed on the captured image displayed on a display device different from the transmissive display device, a region of a real space in which a display image is displayable by the transmissive display device, and the position of the marking in the real space; displaying information representing the position of the marking in the real space in a case in which a position in the real space of the marking in the real space is outside the region of the real space in which the display image is displayable; acquiring a detection result obtained by detecting a visual line of a user of the transmissive display device; comparing the detection result of the visual line with the position in the real space of the marking or information representing the position in the real space of the marking; and changing a display state of the marking or a display state of the information representing the position of the marking.

In order to achieve the above object, a non-transitory storage medium storing an information processing program of an eighth aspect of the present disclosure for causing a processor to execute a process comprises: comparing a captured image captured by a camera attached to a transmissive display device, information representing a position of marking performed on the captured image displayed on a display device different from the transmissive display device, a region of a real space in which a display image is displayable by the transmissive display device, and the position of the marking in the real space; displaying information representing the position of the marking in the real space in a case in which a position in the real space of the marking in the real space is outside the region of the real space in which the display image is displayable; acquiring a detection result obtained by detecting a visual line of a user of the transmissive display device; comparing the detection result of the visual line with the position in the real space of the marking or information representing the position in the real space of the marking; and changing a display state of the marking or a display state of the information representing the position of the marking.

According to the present disclosure, it is possible to sufficiently allow the user of the transmissive display device to visually recognize a position in the real space corresponding to marking.

DESCRIPTION OF THE PREFERRED EMBODIMENTS

Hereinafter, examples of an embodiment for implementing the technique of the present disclosure will be described in detail with reference to the drawings.

Figure 1:
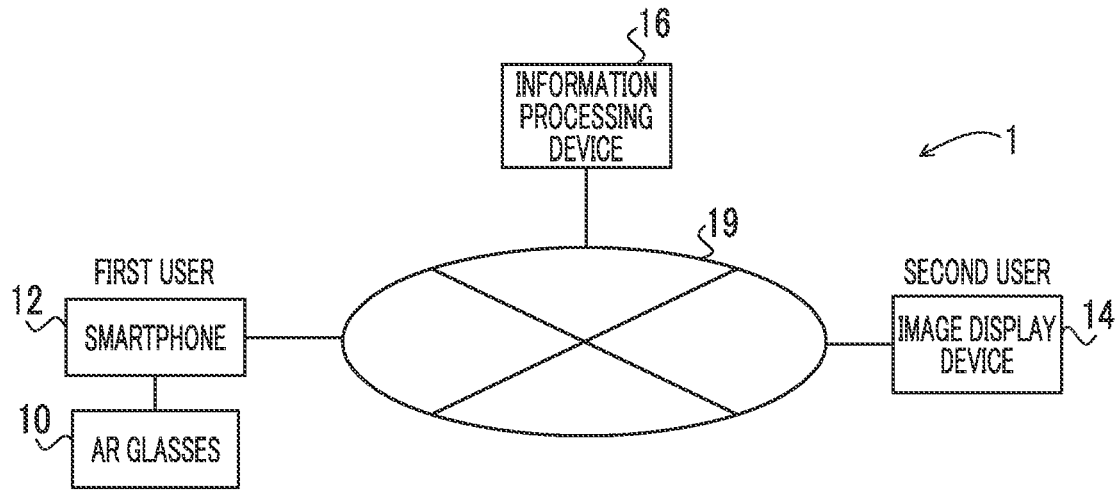
FIG. 1 is a configuration diagram showing an example of a configuration of an information processing system according to an embodiment.

A configuration of an information processing system 1 of the present embodiment will be described with reference to FIG. 1. As shown in FIG. 1, the information processing system 1 of the present embodiment comprises augmented reality (AR) glasses 10, a smartphone 12, an image display device 14, and an information processing device 16. The smartphone 12, the image display device 14, and the information processing device 16 are connected to each other through a network 19 by wired communication or wireless communication. The AR glasses 10 of the present embodiment are examples of the transmissive display device of the present disclosure, and the image display device 14 of the present embodiment is an example of a display device different from the transmissive display device of the present disclosure.

In the information processing system 1 of the present embodiment, the information processing device 16 has a function of displaying a captured image obtained by imaging a real world with the camera of the AR glasses 10 on the image display device 14, and displaying information related to marking performed on the captured image in the image display device 14 on the AR glasses 10. In the following, a user who uses the AR glasses 10 will be referred to as a "first user" and a user who uses the image display device 14 will be referred to as a "second user". In a case in which both the users are collectively called without distinction, both the users will be simply referred to as "users".

Figure 2:
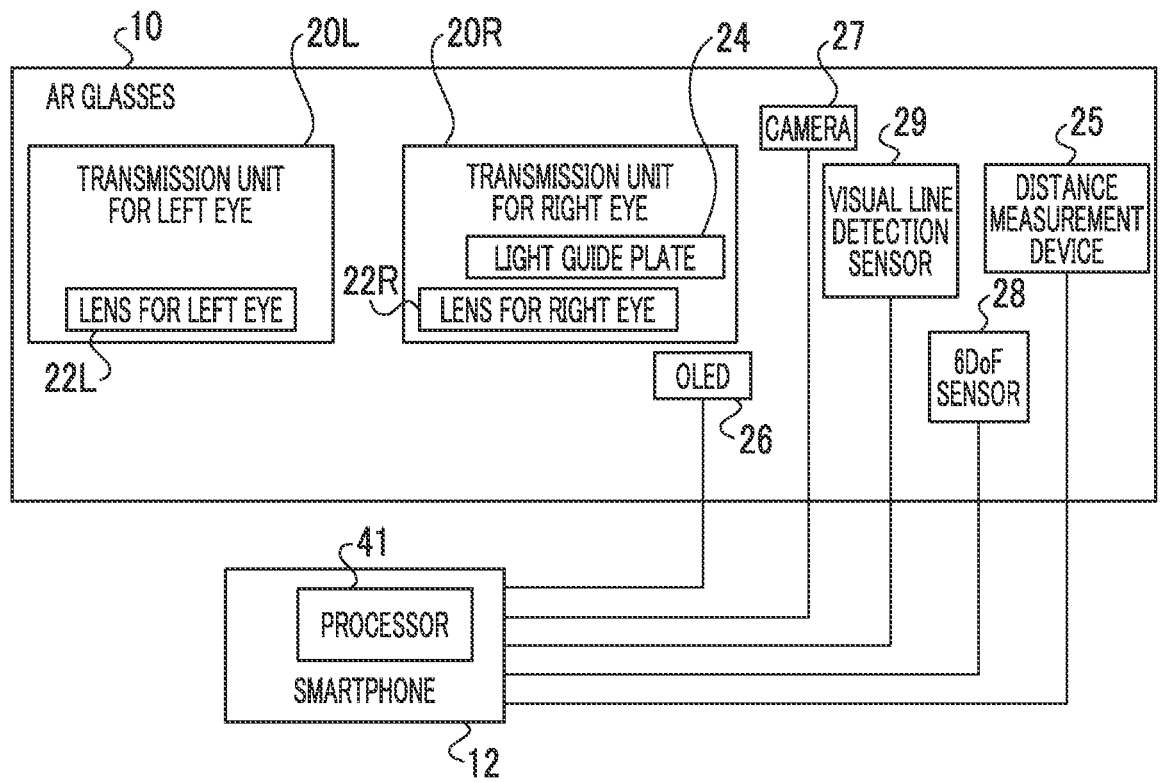
FIG. 2 is a configuration diagram showing an example of AR glasses according to the embodiment.
Figure 3:
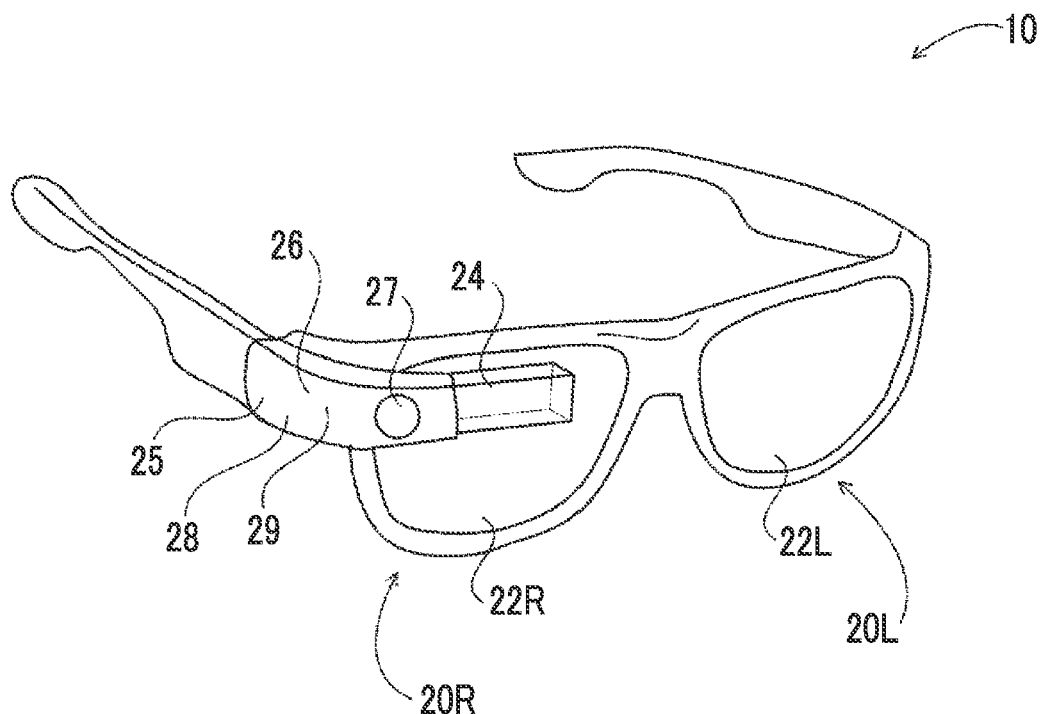
FIG. 3 is a perspective view showing an example of the AR glasses according to the embodiment.

First, configurations of the AR glasses 10 and the smartphone 12 of the present embodiment will be described with reference to FIG. 2 and FIG. 3. FIG. 3 is a perspective view of an example of the AR glasses 10 according to the present embodiment. As shown in FIGS. 2 and 3, the AR glasses 10 comprise a pair of a transmission unit 20L for a left eye and a transmission unit 20R for a right eye, a distance measurement device 25, an OLED 26, a camera 27, a Six-Degrees of Freedom (6DoF) sensor 28, and a visual line detection sensor 29.

The OLED 26 projects an image (projection image), which represents information, onto the transmission unit 20R for a right eye in order to insert information into the visual field of a real image, which is visually recognized by the user through the transmission unit 20R for a right eye, in a superimposed manner.

The transmission unit 20R for a right eye includes a lens 22R for a right eye and a light guide plate 24. Light corresponding to the projection image projected from the OLED 26 is incident on one end of the light guide plate 24. The direction of light propagated through the light guide plate 24 is changed at an emission portion (not shown), and the light is emitted in a direction of the user's eye. The light, which is emitted from the light guide plate 24 and corresponds to the projection image, is transmitted through the lens 22R for a right eye, is guided to the right eye of the user, and is visually recognized as a projected image with the right eye. In addition, the user visually recognizes a real space, which is shown through the lens 22R for a right eye, as a real image with the right eye.

For this reason, while the projection image is projected from the OLED 26, the visually-recognized image visually recognized with the right eye of the user is in a state in which the projected image according to the projection image projected onto the light guide plate 24 is superimposed on the real image representing the real space shown through the lens 22R for a right eye. In addition, while the projection image is not projected from the OLED 26, the visually-recognized image visually recognized by the user is the real image that represents the real space shown through the lens 22R for a right eye and the light guide plate 24.

On the other hand, the transmission unit 20L for a left eye includes a lens 22L for a left eye. The user visually recognizes the real space, which is shown through the lens 22L for a left eye, with the left eye.

The distance measurement device 25 is a device for measuring a distance between the AR glasses 10 and a surrounding region. Examples of the distance measurement device 25 include light detection and ranging (LiDAR). The distance measurement device 25 of the present embodiment measures a distance between the AR glasses 10 and the region range in a region equivalent to the imaging range of the camera 27, and outputs the distance measurement result to the smartphone 12.

The camera 27 is a camera that images the real world that the first user observes. Examples of the camera 27 include a digital camera such as a complementary metal oxide semiconductor (CMOS) camera. In the present embodiment, the camera 27 is capable of capturing a color image in order to provide an image, which represents the real world, to the user. The imaging range of the camera 27 may be a region of the same size as a region of the real space in which the projection image is displayable on the transmission unit 20R for a right eye, or may be a region of a different size. In the present embodiment, the "captured image" refers to an image captured by the camera 27. The captured image captured by the camera 27 is output to the smartphone 12.

The 6DoF sensor 28 has a function of detecting a movement of the AR glasses 10, in other words, a movement of the head of the first user. The 6DoF sensor 28 outputs a detection result to the smartphone 12.

The visual line detection sensor 29 is a sensor that detects the visual line of the first user. A publicly known sensor can be applied as the visual line detection sensor 29, and examples of the visual line detection sensor 29 include a sensor that detects a visual line direction of the first user based on a position of the iris or the pupil. As an example, the AR glasses 10 of the present embodiment detects the visual line of the right eye of the first user. The detection result of the visual line detection sensor 29 is output to the smartphone 12.

Figure 4:
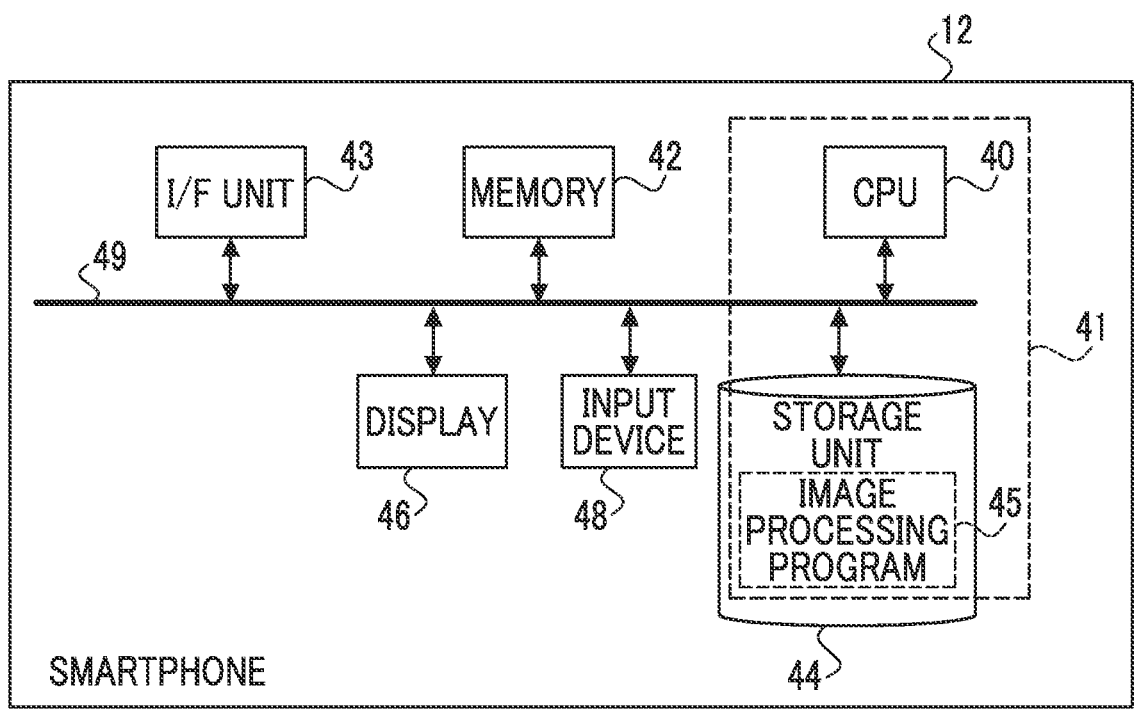
FIG. 4 is a block diagram showing an example of a hardware configuration of a smartphone according to the embodiment.

On the other hand, the smartphone 12 controls the OLED 26 to project the projection image onto the light guide plate 24 from the OLED 26 the AR glasses 10. FIG. 4 shows a block diagram showing an example of a hardware configuration of the smartphone 12. As shown in FIG. 4, the smartphone 12 comprises a central processing unit (CPU) 40, a memory 42, an interface (I/F) unit 43, a storage unit 44, a display 46, and an input device 48. The CPU 40, the memory 42, the I/F unit 43, the storage unit 44, the display 46, and the input device 48 are connected to each other through a bus 49, such as a system bus or a control bus, such that various types of information can be given and received therebetween.

The CPU 40 reads out various programs, which include an image processing program 45 stored in the storage unit 44, to the memory 42 and performs processing corresponding to the program read out. Accordingly, the CPU 40 performs a control of the display of the projection image by the OLED 26. As an example, the processor 41 of the present embodiment is composed of a combination of the CPU 40 and the image processing program 45. The memory 42 is a work memory that is used in a case in which the CPU 40 performs processing.

The image processing program 45 executed in the CPU 40 is stored in the storage unit 44. In addition, the image data (not shown) of the projection image projected from the OLED 26, various other types of information, and the like are also stored in the storage unit 44. Specific examples of the storage unit 44 include a hard disk drive (HDD), a solid state drive (SSD), and the like.

The I/F unit 43 communicates various types of information with each of the OLED 26 using wireless communication or wired communication. The display 46 and the input device 48 function as a user interface. The display 46 provides various types of information, which is related to the projection of the projection image, to a user. The display 46 is not particularly limited, and examples of the display 46 include a liquid crystal monitor, a light emitting diode (LED) monitor, and the like. In addition, the input device 48 is operated by a user so that various instructions related to the projection of the projection image and information related to the destination in the navigation are input. The input device 48 is not particularly limited, and examples of the input device 48 include a keyboard, a touch pen, a mouse, and the like. A touch panel display in which the display 46 and the input device 48 are integrated with each other is employed in the smartphone 12.

On the other hand, as described above, the image display device 14 is used by the second user to observe the captured image captured by the camera 27 of the AR glasses 10.

Figure 5:
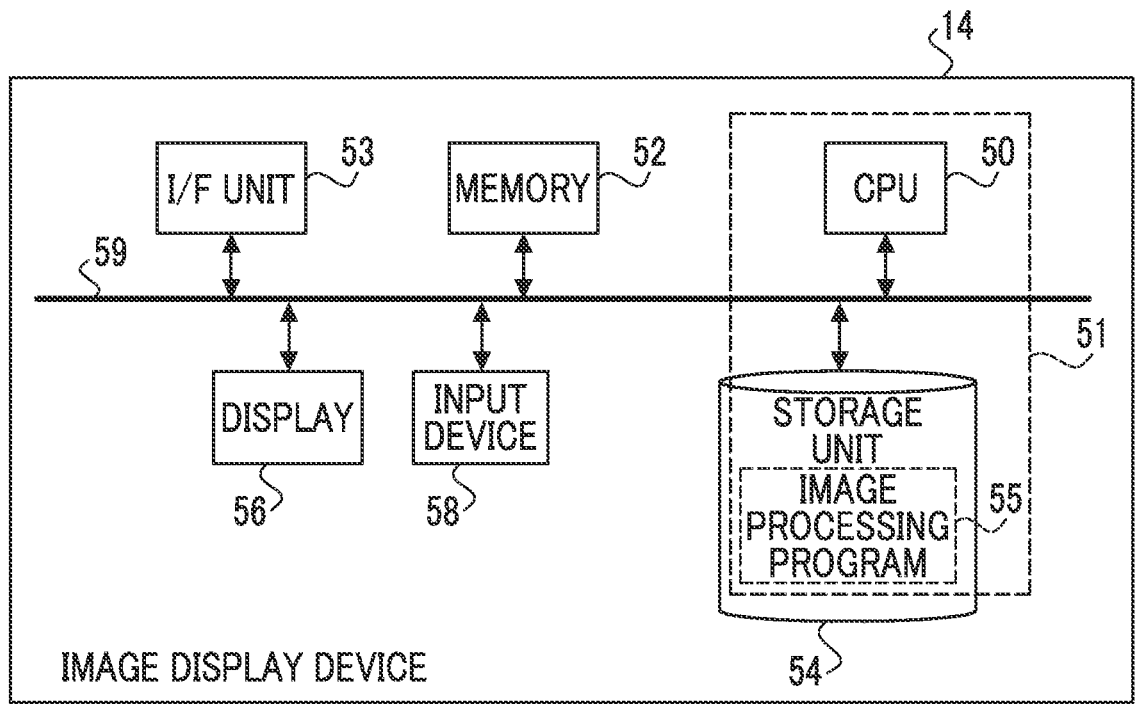
FIG. 5 is a block diagram showing an example of a hardware configuration of an image display device according to the embodiment.

FIG. 5 shows a functional block diagram representing an example of a configuration related to the function of the image display device 14. As shown in FIG. 5, the image display device 14 comprises a CPU 50, a memory 52, an I/F unit 53, a storage unit 54, a display 56, and an input device 58. The CPU 50, the memory 52, the I/F unit 53, the storage unit 54, the display 56, and the input device 58 are connected to each other through a bus 59, such as a system bus or a control bus, such that various types of information can be given and received therebetween.

The CPU 50 reads out various programs, which include a display control program 55 stored in the storage unit 54, to the memory 52 and performs processing according to the read program. As an example, the processor 51 of the present embodiment is composed of a combination of the CPU 50 and the display control program 55. The memory 52 is a work memory that is used in a case in which the CPU 50 performs processing.

The storage unit 54 stores the display control program 55 and the image data of various images received from the smartphone 12, various other types of information, and the like. Specific examples of the storage unit 54 include a HDD, an SSD, and the like.

The I/F unit 53 communicates various types of information with each of the information processing devices 16 using wireless communication or wired communication. The display 56 and the input device 58 function as a user interface. The display 56 displays various images received from the smartphone 12. The display 56 is not particularly limited, and examples of the display 56 include a liquid crystal monitor, an LED monitor, and the like. In addition, the input device 58 is operated by the second user in order to perform marking on the captured image. The input device 58 is not particularly limited, and examples of the input device 58 include a keyboard, a touch pen, a mouse, and the like. A touch panel display in which the display 56 and the input device 58 are integrated with each other may be employed.

On the other hand, as described above, the information processing device 16 has a function of displaying the captured image captured by the camera 27 of the AR glasses 10 on the image display device 14 and displaying information related to marking performed by the image display device 14 on the AR glasses 10.

Figure 6:
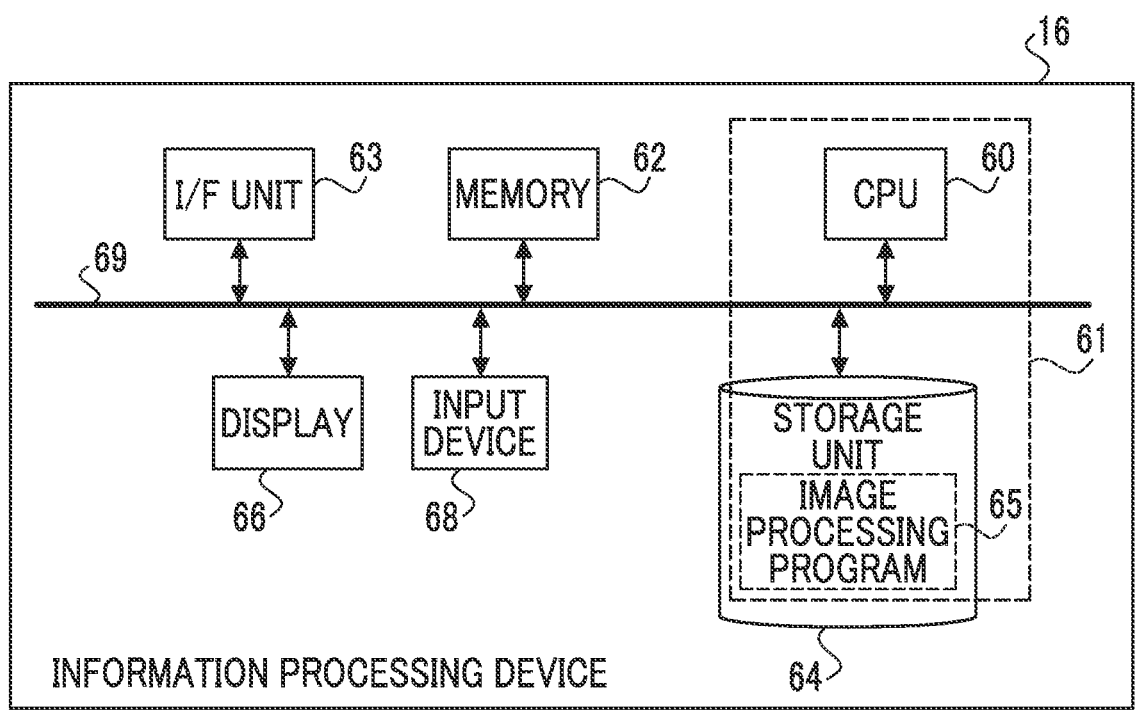
FIG. 6 is a block diagram showing an example of a hardware configuration of an information processing device according to the embodiment.

FIG. 6 shows a functional block diagram representing an example of a configuration related to a function of the information processing device 16. As shown in FIG. 6, the information processing device 16 comprises a CPU 60, a memory 62, an I/F unit 63, a storage unit 64, a display 66, and an input device 68. The CPU 60, the memory 62, the I/F unit 63, the storage unit 64, the display 66, and the input device 68 are connected to each other through a bus 69, such as a system bus or a control bus, such that various types of information can be given and received therebetween.

The CPU 60 reads out various programs, which include an information processing program 65 stored in the storage unit 64, to the memory 62 and performs processing corresponding to the program read out. As an example, a processor 61 of the present embodiment is composed of a combination of the CPU 60 and the information processing program 65. The memory 62 is a work memory that is used in a case in which the CPU 60 performs processing.

The storage unit 64 stores the information processing program 65 and the image data of various images received from the smartphone 12, various other types of information, and the like. Specific examples of the storage unit 64 include a HDD, an SSD, and the like.

The I/F unit 63 communicates various types of information with the smartphone 12 and the image display device 14 using wireless communication or wired communication. The display 66 and the input device 68 function as a user interface. The display 66 displays various images received from the smartphone 12. The display 66 is not particularly limited, and examples of the display 66 include a liquid crystal monitor, an LED monitor, and the like. The input device 68 is not particularly limited, and examples of the input device 68 include a keyboard, a touch pen, a mouse, and the like. A touch panel display in which the display 66 and the input device 68 are integrated with each other may be employed.

Figure 7:
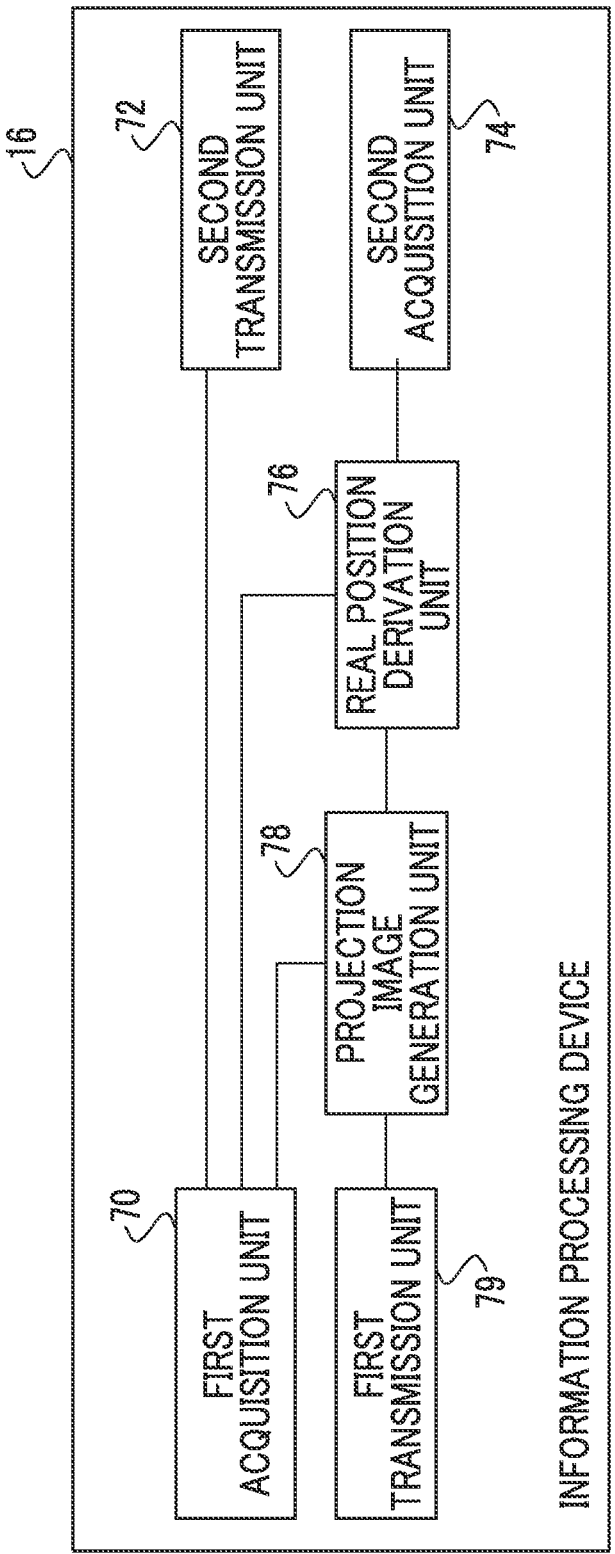
FIG. 7 is a functional block diagram showing an example of a configuration of the information processing device according to the embodiment.

Next, an action of the processor 61 of the information processing device 16 in the present embodiment will be described. FIG. 7 shows a functional block diagram indicating an example of a configuration related to the information processing device 16. The information processing device 16 comprises a first acquisition unit 70, a second transmission unit 72, a second acquisition unit 74, a first marker image 75, a projection image generation unit 78, and a first transmission unit 79.

The first acquisition unit 70 has a function of acquiring the detection result of the distance measurement device 25, the captured image captured by the camera 27, the detection result of the 6DoF sensor 28, and the detection result of the visual line detection sensor 29, from the smartphone 12. The captured image is output to the second transmission unit 72 and the projection image generation unit 78. The detection results of the 6DoF sensor 28 and the distance measurement device 25 are output to a real position derivation unit 76. The detection result of the visual line detection sensor 29 is output to the projection image generation unit 78.

The second transmission unit 72 has a function of outputting the captured image to the image display device 14.

The second acquisition unit 74 has a function of acquiring position information representing a position of the marking performed by the second user in the image display device 14. The position information is output to the real position derivation unit 76.

The real position derivation unit 76 has a function of deriving a position of the marking in the real space (in the following, referred to as a real position) based on the detection result of the distance measurement device 25 and the position information. For example, the real position derivation unit 76 refers to a correspondence relationship between the captured image and the detection result of the distance measurement device 25, and derives the real position of the marking based on the detection result according to the position of the marking with respect to the captured image.

The projection image generation unit 78 compares a region of the real space in which the projection image can be displayed on the AR glasses 10 (in the following, referred to as a displayable region) with the real position of the marking according to the model information of the AR glasses 10. In a case in which the real position of the marking is within the displayable region, the projection image generation unit 78 generates a projection image representing the image of the marking corresponding to the real position. On the other hand, in a case in which the real position of the marking is outside the displayable region, the projection image generation unit 78 generates a projection image representing the position information such as an arrow representing the real position.

The first transmission unit 79 has a function of outputting the projection image generated by the projection image generation unit 78 to the smartphone 12.

Figure 8:
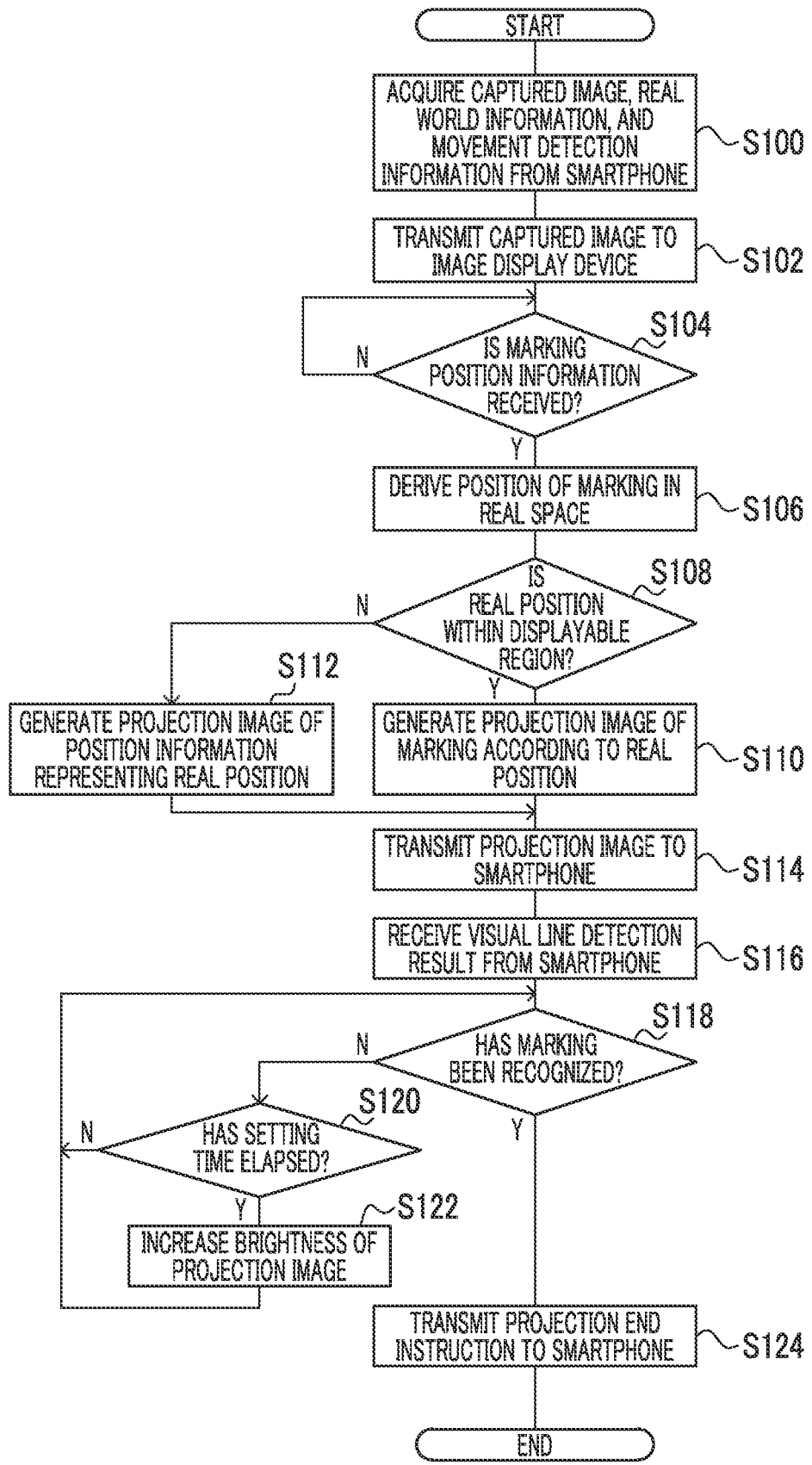
FIG. 8 is a flowchart representing an example of a flow of information processing executed by a processor of the information processing device according to the embodiment.

FIG. 8 shows a flowchart representing an example of a flow of information processing executed by the processor 61 of the information processing device 16.

In Step S100, the first acquisition unit 70 acquires the captured image captured by the camera 27 of the AR glasses 10 through the smartphone 12. In addition, the first acquisition unit 70 also acquires the detection result of the distance measurement device 25 and the detection result of the 6DoF sensor 28.

In the next step S102, the second transmission unit 72 outputs the captured image to the image display device 14. In the image display device 14, the captured image captured by the camera 27 is displayed on the display 56. The second user uses the input device 58 to mark a region of the AR glasses 10 that the second user wants to show to the first user on the captured image displayed on the display 56.

In Step S104, the second acquisition unit 74 determines whether or not position information representing the position of the marking has been received. The determination in Step S104 is a negative determination until it is received, and is an affirmative determination in a case in which it is received, and the processing proceeds to Step S106.

In Step S106, the real position derivation unit 76 derives a real position of the marking based on the information representing the position of the marking and the detection results of the distance measurement device 25 and the 6DoF sensor 28 acquired through the smartphone 12.

In the next step S108, the projection image generation unit 78 determines whether or not the real position is within a displayable region. In a case in which the real position is within the displayable region, the determination in Step S108 is an affirmative determination, and the processing proceeds to Step S110. In Step S110, the projection image generation unit 78 generates a projection image of the marking according to the real position.

On the other hand, in a case in which the real position is outside the displayable region, the determination in Step S108 is a negative determination, and the processing proceeds to Step S112. In Step S112, the projection image generation unit 78 generates a projection image of position information representing the real position.

In the next step S114, the first transmission unit 79 outputs the projection image to the smartphone 12. The smartphone 12 displays the received projection image on the AR glasses 10. In addition, the smartphone 12 outputs the detection result of the visual line detection sensor 29 to the information processing device 16.

In the next step S116, the first acquisition unit 70 receives the detection result of the visual line detection sensor 29 from the smartphone 12.

In the next step S118, the projection image generation unit 78 determines whether or not the first user has visually recognized the marking based on a visual line detection result. Specifically, it is determined whether or not the first user has visually recognized the position in the real space according to the marking.

In a case in which the visual recognition is not performed, the determination is a negative determination, and the processing proceeds to Step S120. In Step S120, the projection image generation unit 78 determines whether or not the setting time has elapsed. The determination is a negative determination from the display of the projection image until the setting time elapses, and the processing returns to Step S118. On the other hand, in a case in which the setting time has elapsed, the determination is an affirmative determination, and the processing proceeds to Step S122. In Step S122, the projection image generation unit 78 increases brightness of the projection image. The projection image with the increased brightness is output to the smartphone 12 by the first transmission unit 79. That is, the projection image generation unit 78 compares the detection result of the visual line with the position of the marking in the real space or with the information representing the position of the marking in the real space, and performs projection to change a display state of the marking or a display state of the information representing the position of the marking.

On the other hand, in a case in which the marking is visually recognized, the determination in Step S118 is an affirmative determination, and the processing proceeds to Step S124. In Step S124, the first transmission unit 79 outputs a projection end instruction to the smartphone 12. Accordingly, the display of the projection image of the marking on the AR glasses 10 ends. In a case in which the processing in Step S124 ends, the information processing shown in FIG. 8 ends.

Accordingly, according to the information processing device 16 of the present embodiment, it is possible to sufficiently allow the user of the AR glasses 10 to visually recognize a position in the real space corresponding to a marking.

A shape of the glasses-type information display device is not limited to a general shape of glasses, an application, or a wearing portion. In addition, the glasses-type information display device may be a monocular type or a compound eye type, and the aspect in which the projected image is visually recognized with one eye has been described in the above-mentioned embodiment, but the projected image may be visually recognized with both eyes. A shape in which the left and right sides are connected like goggles may be used. In addition, it is not limited to devices worn on a human head, like a so-called head-mounted display (for example, if a robot with the appearance of a dog simulates a function of a human, and the function of human eyes is achieved by a camera in the robot's knee, then the control device according to the embodiment of the present disclosure is mounted on the knee). Such a control device is also included in the technique of the present disclosure.

In addition, the AR glasses 10 may comprise some or all of the functions of the processor 61 of the above-mentioned embodiment, or the image display device 14 may comprise the functions.

In addition, the following various processors can be used in the above-mentioned embodiment as the hardware structures of processing units, which perform various types of processing, such as the first acquisition unit 70, the second transmission unit 72, the second acquisition unit 74, the real position derivation unit 76, the projection image generation unit 78, and the first transmission unit 79. The various processors include a programmable logic device (PLD) that is a processor of which the circuit configuration can be changed after manufacture, such as a field programmable gate array (FPGA), a dedicated electrical circuit that is a processor having circuit configuration dedicatedly designed to perform specific processing, such as an application specific integrated circuit (ASIC), and the like in addition to a CPU that is a general-purpose processor functioning as various processing units by executing software (program) as described above.

One processing unit may be formed of one of these various processors, or may be formed of a combination of two or more processors of the same type or different types (for example, a combination of a plurality of FPGAs or a combination of a CPU and an FPGA). In addition, a plurality of processing units may be formed of one processor.

As an example in which a plurality of processing units are formed of one processor, first, as in the above-mentioned embodiment, there is an aspect in which one processor is formed of a combination of one or more CPUs and software as typified by a computer, such as a client or a server, and functions as a plurality of processing units. Second, there is an aspect where a processor fulfilling the functions of the entire system, which includes a plurality of processing units, by one integrated circuit (IC) chip as typified by System On Chip (SoC) or the like is used. In this way, various processing units are formed using one or more of the above-mentioned various processors as hardware structures.

Furthermore, more specifically, electrical circuitry in which circuit elements, such as semiconductor elements, are combined can be used as the hardware structures of these various processors.

In addition, an aspect in which the information processing program 65 is stored (installed) in the storage unit 64 in advance has been described in each of the above-mentioned embodiments, but the present disclosure is not limited thereto. The image processing program 45 may be provided in a form where the image processing program 45 is recorded in recording mediums, such as a compact disc read only memory (CD-ROM), a digital versatile disc read only memory (DVD-ROM), and a universal serial bus (USB) memory. In addition, the information processing program 65 may be downloaded from an external device through a network.

What is claimed is:

1. An information processing device that has a function of displaying a captured image captured by a camera of an augmented reality device used by a first user on an image display device used by a second user, and displaying a projection image which represents position information representing a position of marking performed on the captured image displayed on the image display device, through an input device operated by the second user, on the augmented reality device, the information processing device including:
   a first acquisition unit that acquires the captured image captured by the camera, and a detection result of a distance measurement device attached to the augmented reality device, the distance measurement device measuring a distance between the augmented reality device and a region range in a real space equivalent to an imaging range of the camera,
   a second transmission unit that has a function of outputting the captured image to the image display device,
   a second acquisition unit that acquires the position information from the image display device,
   a real position derivation unit that derives a real position that is a position of the marking in the real space based on the detection result of the distance measurement device and the position information,
   a projection image generation unit that in a case in which the real position of the marking is within a visual field of a real image, which is visually recognized by the first user through the augmented reality device, generates a projection image representing the image of the marking, and in a case in which the real position of the marking is outside the visual field, generates a projection image representing the position information, and
   a first transmission unit that has a function of outputting the projection image to the augmented reality device, wherein the information processing device is configured such that:
the first acquisition unit acquires a visual line of a user of the first user obtained by a visual line detecting sensor attached to the augmented reality device, and
the projection image generation unit determines whether or not the first user has visually recognized the marking based on the visual line and in a case in which the first user has not visually recognized the marking, changes a display state of the projection image.

2. An information processing method executed by a processor in an information processing device that has a function of displaying a captured image captured by a camera of an augmented reality device used by a first user on an image display device used by a second user, and displaying a projection image which represents position information representing a position of marking performed on the captured image displayed on the image display device, through an input device operated by the second user, on the augmented reality device, the method comprising:
acquiring the captured image captured by the camera, and a detection result of a distance measurement device attached to the augmented reality device, the distance measurement device measuring a distance between the augmented reality device and a region range in a real space equivalent to an imaging range of the camera;
outputting the captured image to the image display device;
acquiring the position information from the image display device;
deriving a real position that is a position of the marking in the real space based on the detection result of the distance measurement device and the position information;
in a case in which the real position of the marking is within a visual field of a real image, which is visually recognized by the first user through the augmented reality device, generating a projection image representing the image of the marking, and in a case in which the real position of the marking is outside the visual field, generating a projection image representing the position information; and
outputting the projection image to the augmented reality device,
wherein the method further comprises:
acquiring a visual line of the first user obtained by a visual line detecting sensor attached to the augmented reality device; and
determining whether or not the first user has visually recognized the marking based on the visual line, and in a case in which the first user has not visually recognized the marking, changing a display state of the projection image.

3. A non-transitory storage medium storing an information processing program for causing a processor, in an information processing device that has a function of displaying a captured image captured by a camera of an augmented reality device used by a first user on an image display device used by a second user, and displaying a projection image which represents position information representing a position of marking performed on the captured image displayed on the image display device, through an input device operated by the second user, on the augmented reality device, to execute a process comprising:
acquiring the captured image captured by the camera, and a detection result of a distance measurement device attached to the augmented reality device, the distance measurement device measuring a distance between the augmented reality device and a region range in a real space equivalent to an imaging range of the camera;
outputting the captured image to the image display device;
acquiring the position information from the image display device,
a real position derivation unit that derives a real position that is a position of the marking in the real space based on the detection result of the distance measurement device and the position information;
in a case in which the real position of the marking is within a visual field of a real image, which is visually recognized by the first user through the augmented reality device, generating a projection image representing the image of the marking, and in a case in which the real position of the marking is outside the visual field, generating a projection image representing the position information; and
outputting the projection image to the augmented reality device,
wherein the process further comprises:
acquiring a visual line of the first user obtained by a visual line detecting sensor attached to the augmented reality device; and
determining whether or not the first user has visually recognized the marking based on the visual line, and in a case in which the first user has not visually recognized the marking, changing a display state of the projection image.

4. The information processing device according to claim 1,
wherein the changing of the display state comprises increasing a brightness of the projection image.

* * * * *